(12) United States Patent
Lieu

(10) Patent No.: US 8,467,918 B2
(45) Date of Patent: Jun. 18, 2013

(54) HEURISTIC METHOD FOR COMPUTING PERFORMANCE OF AN AIRCRAFT

(75) Inventor: Brian V. Lieu, Lynnwood, WA (US)

(73) Assignee: Universal Avionics Systems Corporation, Tucson, AZ (US)

( * ) Notice: Subject to any disclaimer, the term of this patent is extended or adjusted under 35 U.S.C. 154(b) by 2 days.

(21) Appl. No.: 13/176,068

(22) Filed: Jul. 5, 2011

(65) Prior Publication Data

US 2013/0013134 A1    Jan. 10, 2013

(51) Int. Cl.
*G01C 23/00* (2006.01)

(52) U.S. Cl.
CPC .................... *G01C 23/005* (2013.01)
USPC .......................................... 701/14

(58) Field of Classification Search
USPC .......................................... 701/14
See application file for complete search history.

(56) References Cited

U.S. PATENT DOCUMENTS

| | | | |
|---|---|---|---|
| 4,837,695 A * | 6/1989 | Baldwin ........................ 701/15 |
| 5,070,458 A * | 12/1991 | Gilmore et al. ................ 701/14 |
| 6,810,676 B2 * | 11/2004 | O'Connor ..................... 60/778 |
| 6,988,368 B2 * | 1/2006 | O'Connor ..................... 60/778 |
| 7,031,812 B1 | 4/2006 | Pettigrew et al. |
| 7,177,785 B2 * | 2/2007 | Hartmann et al. ............. 703/2 |
| 7,626,515 B1 | 12/2009 | Langner et al. |
| 2003/0110777 A1 * | 6/2003 | O'Connor ..................... 60/778 |
| 2004/0260434 A1 * | 12/2004 | Zammit-Mangion et al. .. 701/15 |
| 2005/0028533 A1 * | 2/2005 | O'Connor ..................... 60/778 |
| 2008/0004792 A1 * | 1/2008 | Wise et al. .................... 701/120 |
| 2008/0312776 A1 * | 12/2008 | Sylvester ......................... 701/3 |
| 2009/0216393 A1 * | 8/2009 | Schimert ........................ 701/14 |
| 2010/0152931 A1 * | 6/2010 | Lacombe et al. ................ 701/8 |
| 2010/0217461 A1 * | 8/2010 | Ledesma et al. ............... 701/18 |
| 2010/0332053 A1 * | 12/2010 | Brotherton ...................... 701/3 |
| 2011/0301829 A1 * | 12/2011 | White .......................... 701/120 |
| 2012/0215435 A1 * | 8/2012 | Subbu et al. ................. 701/120 |

OTHER PUBLICATIONS

Introduction to Multidimensional Database Technology, Kenan Systems Corporation, 1993-1995.

* cited by examiner

*Primary Examiner* — Shelley Chen
(74) *Attorney, Agent, or Firm* — Quarles & Brady LLP; George E. Haas

(57) ABSTRACT

A method estimates the vertical airspeed and fuel flow of an aircraft at a point along a flight plan using other aircraft parameters for that point. The process uses a database having entries containing sets of actual values of operating parameters obtained during prior aircraft flights. The database is sorted by data set aggregate values that are is calculated from each set of actual values. When the vertical airspeed and fuel flow estimates are needed, a section thereof is identified based on the aggregate values. That section of the database is analyzed to identify the set of actual operating parameters values that best matches the other aircraft parameters for the flight plan point. The vertical airspeed and fuel flow values from that identified set are used as the estimates. This process reduces the amount of the database that has to be analyzed to locate the data to use.

31 Claims, 2 Drawing Sheets

| 220 → | DATA SET AGREGATE VALUE |
|---|---|
| | ALTITUDE |
| | TRUE AIRSPEED |
| | VERTICAL SPEED |
| | LONGITUDINAL INERTIAL ACCELERATION |
| | OUTSIDE AIR TEMPERATURE |
| | COMPUTED GROSS WEIGHT |
| | FUEL FLOW RATE |

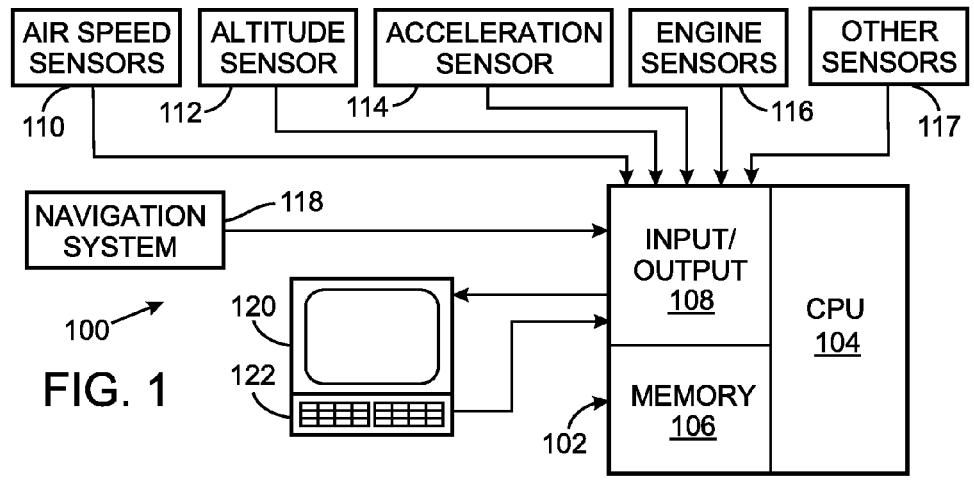
FIG. 1
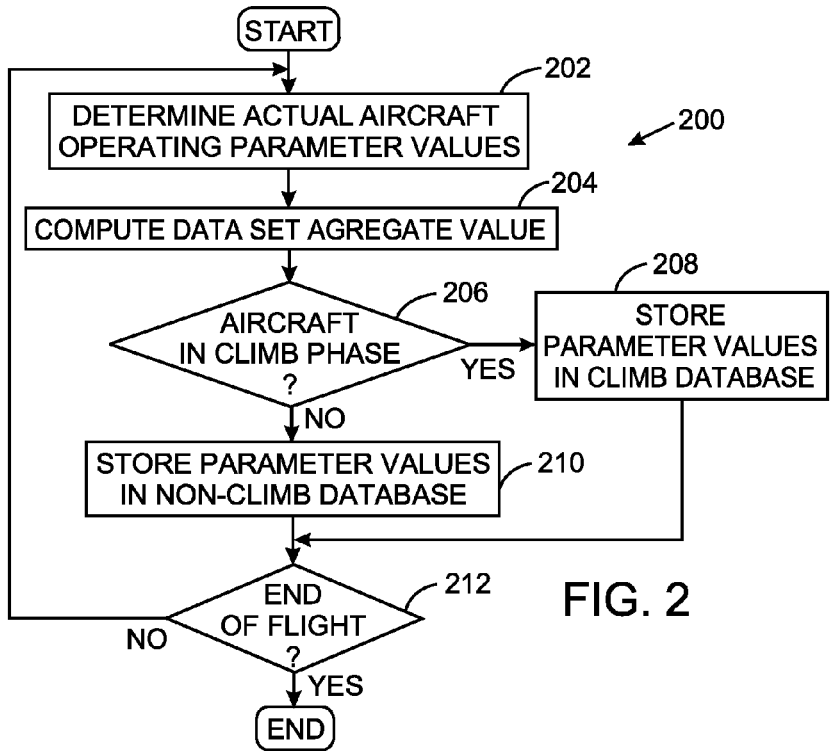
FIG. 2
| DATA SET AGREGATE VALUE |
| --- |
| ALTITUDE |
| TRUE AIRSPEED |
| VERTICAL SPEED |
| LONGITUDINAL INERTIAL ACCELERATION |
| OUTSIDE AIR TEMPERATURE |
| COMPUTED GROSS WEIGHT |
| FUEL FLOW RATE |
FIG. 3

HEURISTIC METHOD FOR COMPUTING PERFORMANCE OF AN AIRCRAFT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a flight management systems for aircraft, and more particularly to determining performance characteristics of the aircraft for use by the flight management system.

2. Description of the Related Art

A flight management system (FMS) is a fundamental component of the avionics on an aircraft. The FMS is a dedicated computer system that automates a wide variety of in-flight tasks, thereby reducing the workload on the flight crew. A primary function is in-flight management of the aircraft flight plan.

A navigation database, stored in the FMS, contains data for constructing the flight plan. This data includes information regarding airways and waypoints, holding patterns, airports, runways, and standard instrument departure paths. Information also is provided about radio navigation aids, including distance measuring equipment, VHF omnidirectional range systems, and non-directional beacons.

The flight plan is usually determined on the ground before departure, either by the pilot of smaller aircraft or an airline dispatcher. The flight plan then is entered into the FMS either via a cockpit keyboard, selection from a stored library of common routes, or via a datalink with the airline dispatch center. The flight plan includes the route, altitude and airspeed for each leg or segment of the trip. During preflight, other information relevant to managing the flight plan, such as gross weight of the aircraft, and fuel weight, is entered into the FMS.

During flight, the FMS constantly examines various onboard sensors to determine the aircraft's positional and performance parameters. From those parameters and the stored flight plan, the FMS calculates the course to follow. The pilot can follow this course manually or the autopilot can be set to follow the course. The flight plan in the FMS often is modified during the flight by the pilot. In which case, the FMS has to rebuild flight plan information.

There is a desire as part of the flight management process for the FMS to compute three dimensional trajectories of the aircraft operating under a set of profiles such as airspeed targets, engine thrust settings, speed and altitude constraints, forecasted winds, and other operational parameters in the climb, cruise, and descent phases of flight. Algorithms for that computation typically require knowledge of the engine fuel flow rate and the aircraft climb capability, which are characteristics specific to the particular airframe and engine combination. The necessary detailed aerodynamic models of the airframe and the engine for a specific aircraft, however, are only available from the aircraft manufacturer, which often considers that information highly proprietary. Thus the requisite aircraft performance data is usually unavailable to other companies that produce avionic equipment.

It is theoretically possible for an avionics manufacturer to measure operating characteristics of a given type of aircraft and use that data to build a multi-dimensional database from which to subsequently retrieve the desired fuel flow and climb rate parameters. Nevertheless, in order for these databases to be comprehensive enough for practical use in constructing aircraft trajectories during the flight plan process, such a large amount of empirical data would have to be gathered over a very great amount of flight time that such approach is not very practical. In addition, searching that large database to find the data providing the best match to a given set of operating conditions in the future requires a very exhaustive process. Thus such a database search presents such a significant obstacle as to render this approach impractical.

Even if this empirical approach was to be used, the particular database only could be used effectively with that one type of aircraft.

Therefore, it is desirable to develop another approach that requires a lesser amount of aircraft performance data to be able to derive reliable values for aircraft operating parameters, such as the engine fuel flow rate and the aircraft climb rate.

SUMMARY OF THE INVENTION

A performance parameter of an aircraft is estimated by a method that involves repeatedly sensing the performance parameter and sensing a plurality of other operating parameters during flight of the aircraft. This produces a set of correlated actual values for those operating parameters. A data set aggregate value is calculated from each set of correlated operating parameter values. Each associated group of a sensed performance parameter value, correlated operating parameter values, and the related data set aggregate value is stored as an entry in a database for subsequent use. The entries in the database may be sorted by the data set aggregate values.

Then during operation of the aircraft, the complexity of searching the database for performance parameter values to use, such as to compute the flight trajectories for example, is reduced by employing an anticipated aggregate value that encapsulates a constraint which has to be satisfied by the best match of parameter values in the database. Thus the anticipated aggregate value associated with an aircraft state of interest is employed to target a section in the database to search. A detailed search is performed for the best parameter set within that database section. The set of operating parameters in the database section that comprises the best match to the operating parameters for the aircraft state of interest is selected for use in computing the flight trajectories.

In more specific terms, for an expected point during operation of the aircraft, such as a location along a flight plan, anticipated values for the plurality of operating parameters are determined. The resultant set of anticipated operating parameter values is used to calculate an anticipated aggregate value in the same manner as each data set aggregate value was calculated.

The process then selects a set of actual operating parameter values from the database which set has a data set aggregate value that most closely matches the anticipated aggregate value. For example, the selection is based on the set of actual operating parameter values in the database that is numerically closest to the anticipated aggregate value. This selection identifies a section of the database that is around the selected set of data, in which to conduct a more detailed analysis of the operating parameters to find the performance parameter value to use for aircraft flight management. That section is smaller than the entire database and, for example, is a predefined number of entries in the database around the entry that has the closest aggregate value match.

The sets of values for the operating parameters in this database section are analyzed to find the set that best matches the anticipated values for the plurality of operating parameters at the flight plan point of interest. In one embodiment of the present estimation method, a least sum of the squares of the deviations is performed to find the best match. Thereafter, the estimate of the performance parameter is derived using the value of that performance parameter from the best matching sets of aircraft parameter values in the database.

This provides an estimated value for the performance parameter at an expected aircraft operating point without use of the specific aerodynamic models of the airframe and the aircraft engines. The present technique heuristically finds the best estimate of the performance parameter based on its values as experienced by the aircraft under similar flight conditions as anticipated at the expected aircraft operating point.

Another aspect of the present method pertains to maintenance of the database. This involves the continuous replenishment of the database with actual aircraft performance characteristics sensed during flight. Newly captured aircraft operating parameter data are screened for reasonableness, then either replace an existing entry in the database that is determined to be an approximate duplicate, or are added as a new data point. The criteria for determining whether new and existing data sets are similar enough to be deemed approximate duplicates is based on deviation threshold values for each of the parameters in the set. The threshold values are judiciously chosen to balance the overall size of the database versus accuracy requirements.

BRIEF DESCRIPTION OF THE DRAWINGS

FIG. 1 is a block schematic diagram of a flight management system of an aircraft;

FIG. 2 is a flowchart of a heuristic process for building a database of performance characteristics of the particular aircraft;

FIG. 3 depicts the data structure of one set of performance characteristics in the database.

DETAILED DESCRIPTION OF THE INVENTION

Figure 4:
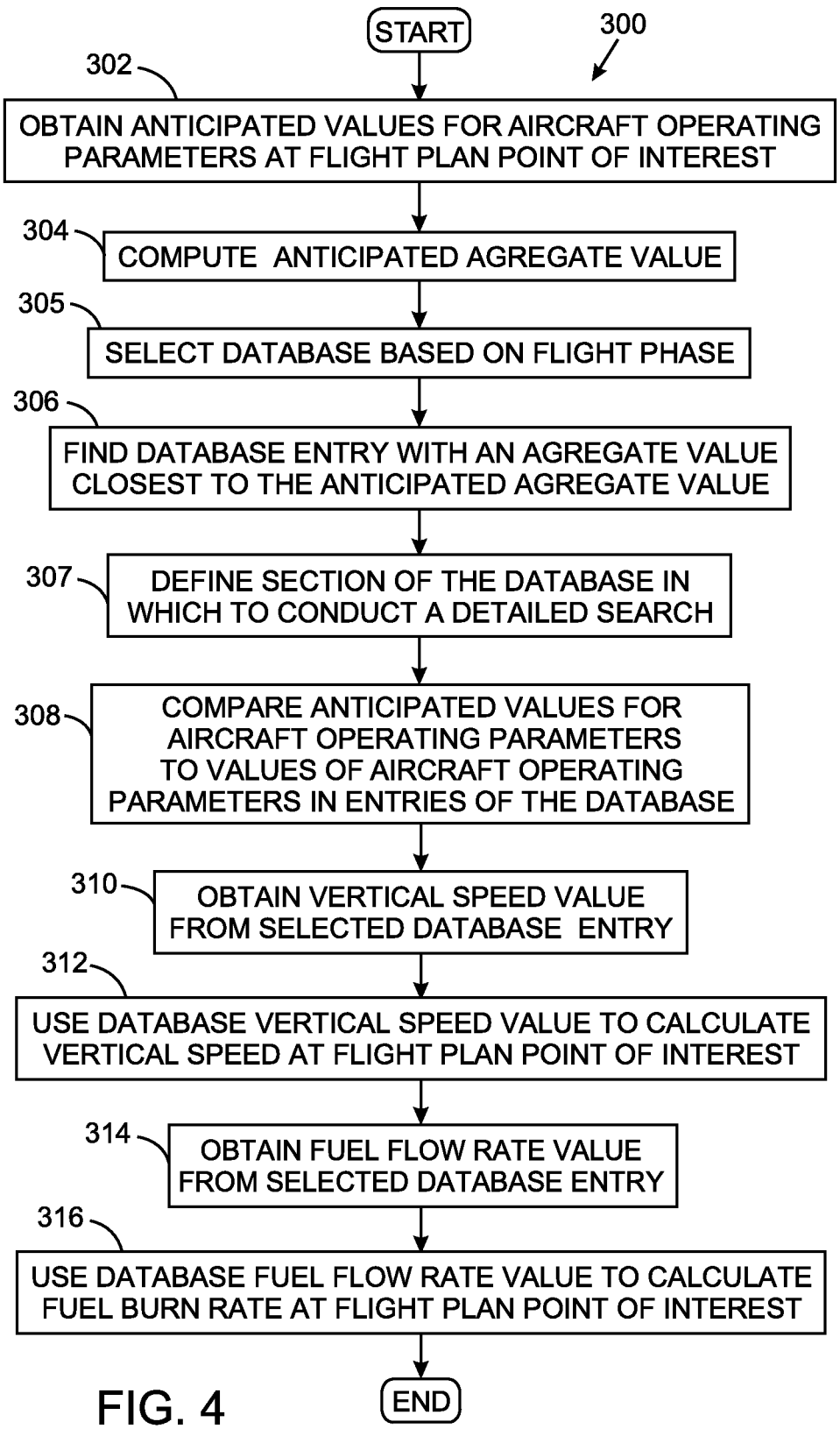
FIG. 4 is a flowchart of a method for computing a vertical speed (or climb rate) and a fuel flow rate for the aircraft using the databases.

With initial reference to FIG. 1, the avionics 100 onboard an aircraft includes a flight management system (FMS) 102 that comprises a central processing unit (CPU) 104. The CPU executes software that implements the flight management of the aircraft with which the FMS is used. The software instructions for governing the operation of the FMS 102, data specifying operational capabilities of the aircraft, and other control data received and produced by the FMS are stored in a memory 106. The memory 106 comprises one or more of a random access memory, a CD-ROM, a hard disk and other types of storage devices known in the art.

An input/output (I/O) circuit 108 interfaces the CPU 104 with several groups of sensors on the aircraft. The sensors include airspeed sensors 110 for determining both the true airspeed and the vertical airspeed of the aircraft. An altitude sensor 112 and an acceleration sensor 114 also are connected to inputs of the input/output circuit 108. Several conventional sensors 116 are provided to detect operating parameters of the aircraft engines. Other sensors 117 commonly used with flight management systems also are connected to the FMS 102. A conventional aircraft navigation system 118 also provides data to the CPU's input/output circuit 108.

The flight crew of the aircraft interfaces with the flight management system 102 via a display device 120 and a keyboard 122. The keyboard 122 can be employed to enter the aircraft flight plan into the FMS 102 and the display device 120 provides a visual depiction of the flight plan during air travel. Additional input/output devices may be provided to permit the flight crew to input data and commands into and receive information from the FMS.

The FMS 102 may be one of several models available from Universal Avionics Systems Corporation of Tucson, Ariz., U.S.A., for example. Such a conventional FMS is augmented with additional software to implement the present method for computing aircraft performance characteristics, as is described hereinafter.

With reference to FIG. 2, the present aircraft performance assessment technique utilizes databases of operating parameters comprising positional data and performance characteristics of the aircraft that are gathered during actual flights. Prior to flight, the pilot enters the gross weight of the aircraft and the weight of on-board fuel into the FMS 102 along with the flight plan data. While the aircraft is in flight, the FMS 102 periodically executes a data gathering routine 200 that commences at step 202 by reading the sensors 110-116 to acquire values for certain aircraft operational and positional parameters. From the sensor data the FMS CPU 104 calculates other parameters. This provides a set of aircraft operating parameters that includes, for example but is not limited to, altitude, true airspeed, longitudinal inertial acceleration, outside air temperature, and present gross weight of the aircraft. Also derived by the FMS 102 are the vertical airspeed, which also is referred to as the "climb rate," and the total fuel flow rate to all the engines, which also is referred to as the "fuel burn rate", which two factors are referred to herein as "performance parameters." The present gross weight of the aircraft is the initial gross weight prior to takeoff minus the weight of the fuel that has been consumed during flight.

Each newly acquired value for an aircraft parameter is inspected to ensure that it is not an aberration, due to a transient condition, and does not inappropriately deviates from the several previously acquired values of the same parameter. If such aberrant parameter value is found, the entire data set for that point in the flight is discarded and the process waits at step 202 for a period of time before obtaining another set of operating parameter data to process.

Then at step 204, some of the new values are used to calculate a data set aggregate value for the recently acquired set of aircraft parameter values. For example, the following equation can be used to compute that data set aggregate value (AV):

$$AV_i = (Aq_i + B(w_i^2/q_i) + Cw_i) \div L_i$$

where subscript i is a numerical value designating the particular set of sensed operating parameter values, A, B and C are constants customized for a specific airframe, w is the present gross weight, and L is engine thrust lapse rate. For flight regimes where engine power is set according to the needed thrust (e.g., during cruise and descent phases of flight), L is set to one. For flight regimes governed by set engine power, such as during climb out, L is chosen to reflect commonly known nominal lapse characteristics of the engine thrust and thus is a function of altitude and true airspeed. The variable q is the dynamic pressure scaled for compressibility and in this instance is formulated by:

$$q_i = \frac{1481 \times \delta_i \times M^2}{\sqrt{1-M_i^2}}$$

where δ is the standard atmospheric pressure ratio and is a function of altitude, and M is the Mach number for the true airspeed.

The actual vales for the operating and performance parameters are stored in two databases within the memory 106 of the FMS 102. A first database contains the sensed operating parameters acquired during the climb phase of flight and a second database contains the actual operating parameters acquired in other phases of the flight. Therefore at step 206, a determination is made whether the aircraft is in the climb phase, i.e. when the vertical airspeed is greater than a given threshold or when the aircraft altitude is increasing faster that a predefined threshold rate. Based on that determination, the data gathering routine branches to either step 208 to store the set of actual operating parameter values in the first database in the memory 106 for the climb phase or to step 210 to store the set of actual values in the second database for the non-climb phases of flight. In both steps 208 and 210, the set of values of the actual operating parameters of the aircraft is stored in an entry 220 as depicted graphically in FIG. 3. It should be understood that values for other aircraft operating parameters also may be stored in this database entry.

The entries 220 within each database are sorted by the data set aggregate value. One skilled in the art will appreciate that simply storing every new set of acquired performance a data would result in an extremely large database that then will be unreasonable to use efficiently. Furthermore having multiple entries with very similar values for the individual operating parameters does not significantly increase the usefulness of the database as using one or the other of such similar entries does not produce a significant practical difference. Therefore, the storage steps 208 and 210 only store a new entry in the database if the set of aircraft operating parameters are significantly different that an existing set of operating parameters in the database. Otherwise, in the case of extreme similarity, the new parameters replace the existing set with the closely matching data set. That replacement is desirable so that the database represents the most current performance characteristics of the aircraft, which characteristics can change over the aircraft's life. Thus at either step 208 or 210 a search is made for any existing database entry that has a data set aggregate value which is within a range of values on either side of the data set aggregate value for the new set of actual operating parameter values. If that search finds a close match with an existing aggregate value, the individual parameters in the new and existing sets are analyzed to determine if they are substantially identical. Whether two sets of data are considered to be substantially identical is based on the values of individual operating parameters being relatively close, as defined by a deviation threshold. If the two data sets are thereby deemed to be substantially identical, the new set of actual operating parameter values replaces that existing set at either step 208 or 210. Otherwise, the new set of actual operating parameter values is stored as a new database entry.

After the new set of actual values for the operating parameters has been stored in the appropriate database, a determination is made at step 212 whether the aircraft is still in flight. If so, the data gathering routine 200 returns to step 202 to obtain and process another set of sensed operating parameter values. If the flight has finished, the data gathering routine 200 terminates until another flight.

In this manner, database is continuously replenished with actual performance parameters sensed during operational flights. Newly captured data points are screened for reasonableness, then replace existing data points in the database that are determined to be duplicates, or otherwise added to the database. The criteria for determining whether data points are similar enough to be deemed duplicates is based on deviation threshold values for each of the input parameters. The threshold values are judiciously chosen to balance the overall size of the database versus accuracy requirements.

The databases are employed during pre-flight by the FMS 102 to compute three dimensional trajectories of the aircraft for the different segments and phases of the proposed flight plan. As noted above, in order to perform those computations for a comprehensive flight plan, detailed aerodynamic models of the airframe and the engine for this specific aircraft previously were required. Those models, however, are considered proprietary by aircraft manufacturers and usually unavailable to other companies that produce avionic equipment. As a consequence, the present technique has been developed to estimate values for the fuel flow rate and the vertical airspeed at desired points in the flight plan without the use of the specific aerodynamic models of the airframe and the aircraft engines. The present technique heuristically finds the best estimate of the fuel flow rate (fuel burn rate) and the a vertical speed (climb rate) based on the values for those two parameters as experienced by the aircraft under similar flight conditions as anticipated at a point of interest in the flight plan.

During the construction of the flight plan in the FMS 102, when that standard process requires either or both of the fuel flow rate and the vertical speed for a particular point of interest in the projected flight, the FMS 102 executes the parameter derivation routine 300 depicted in FIG. 4 to derive those aircraft operating parameters. The parameter derivation routine 300 can be executed during the pre-flight stage or during a flight when the flight crew enters a change in the previously defined flight plan. The routine 300 commences at step 302 where the FMS 102 determines anticipated values for aircraft operating parameters at a point of interest along the flight plan. Those operating parameters may include altitude, true airspeed, and longitudinal inertial acceleration, values for which are determined from the flight plan. Also included, for example, are anticipated outside air temperature, derived from the altitude and meteorological data, and the present gross weight of the aircraft. Then at step 304, an anticipated aggregate value is calculated for those anticipated operating parameters values, using the same equation or process as was used to compute the data set aggregate value for each data entry in the FMS databases.

At step 305, a determination is made whether the flight point of interest is to occur during the climb phase of flight. This determines which of the two FMS databases, the climb database or the non-climb database, is to be used at this juncture. The appropriate database is then accessed at step 306 to find an entry that has a data set aggregate value that most closely matches the anticipated aggregate value for the flight plan point of interest. The ideal match is when those aggregate values are identical, otherwise the closest match is the data set aggregate value with the smallest difference with respect to the anticipated aggregate value. The location of the entry with the closest aggregate value match at step 307 determines a section of the selected database in which to search for a set of operating parameter values that is the best match to the operating parameters of the aircraft at the point of interest in the flight plan. This use of the aggregate value narrows the ranges of the search, i.e. reduces the number of database entries that have to be analyzed. The search section comprises a predetermined number of database entries around the one with the best aggregate value match and that number is judiciously defined to balance processing time versus accuracy requirements. Because the selected database is sorted by the data set aggregate value, the database section contains entries that have numerically close data set aggregate values and thus similar sets of actual values for the operating parameters and the performance parameters.

The present selection method uses the least sum of the squares of the deviations between the set of anticipated operating parameters and the sets in the database to find the set of operating parameters in the database that best matches the aircraft operating parameters at the point of interest in the flight plan. The number of gradient equations used in the least sum of the squares process is selected so that the analysis occurs in a timely manner.

After locating the entry in the database that best matches the operating parameter values at the flight plan point of interest, the value of the vertical speed in that entry is obtained at step 308 and then used at step 310 to calculate the vertical speed ($VS_x$) at the flight plan point of interest. That calculation employs the following equation:

$$VS_x = VS_{DB} + VS_{RESIDUAL}$$

where $VS_{DB}$ is the vertical airspeed value from the database entry that has the best aggregate value match, and $VS_{RESIDUAL}$ is an adjustment for the deviation of the database vertical airspeed value due to difference between the anticipated operating parameter values for the flight plan point of interest and the set of actual operating parameter values that is selected. $VS_{RESIDUAL}$ is given by:

$$VS_{residual} = f(h_x, w_x, v_x, t_x, \dot{v}_x)$$

$$VS_{residual} = VS_{db}\left(\frac{w_{db}}{w_x}\frac{v_x}{v_{db}}\frac{L_x}{L_{db}} - 1\right) + \frac{v_x}{g}\left(\frac{w_{db}}{w_x}\frac{L_x}{L_{db}}\dot{v}_{db} - \dot{v}_x\right) + A\frac{v_x}{w_x}\left(q_{db}\frac{L_x}{L_{db}} - q_x\right) + B\frac{v_x}{w_x}\left(\frac{w_{db}^2}{q_{db}}\frac{L_x}{L_{db}} - \frac{w_x^2}{q_x}\right) + C\frac{v_x}{w_x}\left(w_{db}\frac{L_x}{L_{db}} - w_x\right)$$

where h, w, v, t, and $\dot{v}$ are altitude, gross weight, true airspeed, outside air temperature, and longitudinal inertial acceleration, respectively. Variables and operating parameter values with the subscript db are obtained from the selected database entry and subscript x designates variables and operating parameter values at the particular point of interest along the flight plan.

Next at step 312, the CPU 104 obtains the actual value of the fuel flow rate from the selected database entry. That value is then employed at step 316 to calculate the fuel flow rate (FF) at the flight plan point of interest. This calculation employs the equation:

$$FF = FF_{DB} + FF_{RESIDUAL}$$

where $FF_{DB}$ is the aircraft fuel flow value from the database entry that has the best aggregate value match, and $FF_{RESIDUAL}$ is an adjustment for the deviation of the database aircraft fuel flow value. The value of $FF_{RESIDUAL}$ for a climb phase (CLB) or a non-climb phase (CRZ) is derived according to the expressions:

$$FF_{residual} = f(h_x, w_x, v_x, t_x, \dot{v}_x)$$

$$FF_{residual,CLB} = \left(\frac{L_x}{L_{db}}\frac{I_x}{I_{db}} - 1\right) \times FF_{db}$$

$$FF_{residual,CRZ} = \left(\frac{w_x\left(\frac{VS_x}{v_x} + \frac{\dot{v}_x}{g}\right) + Aq_x + B\frac{w_x^2}{q_x} + Cw_x}{w_{db}\left(\frac{VS_{db}}{v_{db}} + \frac{\dot{v}_{db}}{g}\right) + Aq_{db} + B\frac{w_{db}^2}{q_{db}} + Cw_{db}}\frac{I_x}{I_{db}} - 1\right) \times FF_{ab}$$

where VS is the vertical speed and g is the gravitational constant. I is fuel burn lapse rate and is chosen to reflect commonly known nominal lapse characteristics of the engine fuel burn. In this application, the fuel burn lapse rate is a function of altitude.

The values for the fuel flow rate and the vertical airspeed, as calculated at step 310 and 314, respectively, are then employed by the flight management system 102 in a conventional manner to construct the trajectory of the aircraft at the designated point of interest.

The present heuristic method for determining the fuel flow rate and vertical airspeed provides sufficient accuracy for flight planning with a relatively small amount of empirical aircraft performance data as compared to a process that merely creates separate two dimensional databases for fuel flow rate and vertical airspeed.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A method for providing an estimate of a performance parameter of an aircraft comprising:
    determining anticipated values for a plurality of operating parameters that are expected to occur during operation of the aircraft;
    calculating an anticipated aggregate value by solving an equation using the anticipated values;
    accessing a database that contains a plurality of sets of data derived from different operating conditions of the aircraft, each set of data containing values for the plurality of operating parameters, a value of the performance parameter, and a data set aggregate value;
    selecting one set of data in the database based on a comparison of the data set aggregate value and the anticipated aggregate value;
    employing the one set of data to obtain a value of the performance parameter from the database; and
    defining the estimate of the performance parameter in response to the value of the performance parameter obtained from the database.

2. The method as recited in claim 1 wherein the performance parameter is at least one of vertical airspeed and fuel flow rate.

3. The method as recited in claim 1 wherein the plurality of operating parameters includes one or more of altitude, true airspeed, longitudinal inertial acceleration, outside air temperature, and weight of the aircraft.

4. The method as recited in claim 1 wherein selecting one set of data chooses a set of data in the database that has the data set aggregate value that is closest numerically to the anticipated aggregate value.

5. The method as recited in claim 1 wherein employing the one set of data comprises:

analyzing the sets of data within a given section of the database, which section is smaller than the entire database and includes the one set of data; and selecting a set of data within a given section that best matches the anticipated values for a plurality of operating parameters.

6. The method as recited in claim 5 wherein a least sum of the squares of deviations is used to determine the set of data within a given section that best matches the anticipated values for a plurality of operating parameters.

7. The method as recited in claim 1 wherein defining the estimate of the performance parameter (VS) employs the equation:

$$VS=VS_{DB}+VS_{RESIDUAL}$$

where $VS_{DB}$ is the value of the performance parameter obtained from the database, and $VS_{RESIDUAL}$ is an adjustment that accounts for deviation of $VS_{DB}$ due to difference between the anticipated values and a set of data from which the value of the performance parameter was obtained.

8. A method for providing an estimate of a performance parameter of an aircraft comprising:

during flight of the aircraft repeatedly determining sets of actual values of a plurality of operating parameters and an actual value of a performance parameter, thereby producing multiple sets of actual values;

for each set of actual values, calculating, based on the actual values in that set, a data set aggregate value and associating that data set aggregate value with that set of actual values;

for an expected point during operation of the aircraft, determining anticipated values for the plurality of operating parameters;

calculating an anticipated aggregate value by solving an equation that uses each of the anticipated values;

selecting a plurality of sets of actual values in response to a comparison of the anticipated aggregate value with the data set aggregate values associated with each of those plurality of sets of actual values;

analyzing the plurality of sets of actual values to identify a given set of actual values which most closely matches the anticipated values; and deriving the estimate of the performance parameter in response to the actual value of a performance parameter in the given set of actual values.

9. The method as recited in claim 8 wherein the performance parameter is at least one of vertical airspeed and fuel flow rate.

10. The method as recited in claim 8 wherein the plurality of operating parameters includes one or more of altitude, true airspeed, longitudinal inertial acceleration, outside air temperature, and weight of the aircraft.

11. The method as recited in claim 8 wherein analyzing the plurality of sets of actual values employs a least sum of the squares of deviations to identify a given set of actual values which most closely matches the anticipated values.

12. The method as recited in claim 8 wherein selecting a plurality of sets of actual values comprises choosing a set of actual values that is associated with a data set aggregate value which is closest numerically to the anticipated aggregate value, thereby choosing a chosen set of actual values.

13. The method as recited in claim 12 wherein selecting a plurality of sets of actual values further comprises defining a section of the database that contains the chosen set of actual values; and selecting the actual value of a performance parameter from the chosen set of actual values.

14. The method as recited in claim 8 wherein deriving the estimate of the performance parameter (VS) employs the equation:

$$VS=VS_{DB}+VS_{RESIDUAL}$$

where $VS_{DB}$ is the actual value of a performance parameter in the given set of actual values, and $VS_{RESIDUAL}$ is an adjustment that accounts for deviation of $VS_{DB}$ due to difference between the anticipated values and the given set of actual values.

15. A method for providing an estimate of a performance parameter of an aircraft comprising:

during flight of the aircraft repeatedly determining actual values of a plurality of operating parameters and an actual value of a performance parameter, thereby producing multiple sets of actual values;

for each set of actual values, calculating a data set aggregate value using the values of the plurality of operating parameters in that set;

storing in a database, as a separate entry, each set of actual values and the data set aggregate value calculated therefrom;

for a point along a flight plan of the aircraft, deriving anticipated values for the plurality of operating parameters;

calculating an anticipated aggregate value using an equation that uses each of the anticipated values;

selecting an entry in the database which entry has a data set aggregate value that best matches the anticipated aggregate value;

in response to the entry in the database, selecting a section of the database, which section contains multiple entries; and analyzing the sets of actual values within the section of the database to identify a given set of actual values which most closely matches the anticipated values; and deriving the estimate of the performance parameter in response to the actual value of a performance parameter in the given set of actual values.

16. The method as recited in claim 15 wherein the performance parameter is at least one of vertical airspeed and fuel flow rate.

17. The method as recited in claim 15 wherein the plurality of operating parameters includes one or more of altitude, true airspeed, longitudinal inertial acceleration, outside air temperature, and weight of the aircraft.

18. The method as recited in claim 15 wherein analyzing the sets of actual values employs a least sum of the squares of deviations to identify the given set of actual values which most closely matches the anticipated values.

19. The method as recited in claim 15 wherein deriving the estimate of the performance parameter (VS) employs the following equation:

$$VS=VS_{DB}+VS_{RESIDUAL}$$

where $VS_{DB}$ is a value of the performance parameter from the entry in the database that is selected, and $VS_{RESIDUAL}$ is an adjustment that accounts for deviation of $VS_{DB}$ due to difference between the anticipated values and the actual values of the plurality of operating parameters in the given set of actual values.

20. The method as recited in claim 15 further comprising:

creating a first database for storing sets of actual values determined from when the aircraft is in a climb phase of flight, and creating a second database for storing sets of actual values determined from when the aircraft is in non-climb phases of flight; and wherein storing in a database stores each set of actual values and the data set aggregate value calculated therefrom in one of the first and second database in response to a phase of flight related to those actual values.

21. The method as recited in claim 20:

further comprises designating whether the point along a flight plan of the aircraft occurs during a climb or a non-climb phase of flight; and wherein selecting an entry, selecting a section, analyzing the sets of actual values and deriving the estimate of the performance parameter utilize one of the first and second databases chosen in response to the designating.

22. A method for estimating vertical airspeed and fuel flow rate of an aircraft comprising:

during flight of the aircraft repeatedly determining actual values of a plurality of operating parameters, an actual vertical airspeed value, and an actual fuel flow rate value, thereby producing multiple sets of actual values;

for each set of actual values, calculating a data set aggregate value;

storing in a database as a separate entry, each set of actual values and the data set aggregate value calculated therefore;

for a point along a flight plan of the aircraft, deriving anticipated values for the plurality of operating parameters;

calculating an anticipated aggregate value using an equation that uses each of the anticipated values;

selecting an entry in the database which entry has a data set aggregate value that best matches the anticipated aggregate value;

in response to the entry in the database, selecting a section of the database, which section contains multiple entries; and analyzing the sets of actual values within the section of the database to identify a given set of actual values which most closely matches the anticipated values;

deriving an estimate of the vertical airspeed in response to the actual vertical airspeed value in the given set of actual values; and deriving an estimate of the fuel flow rate in response to the actual fuel flow rate value in the given set of actual values.

23. The method as recited in claim 22 wherein the plurality of operating parameters includes one or more of altitude, true airspeed, longitudinal inertial acceleration, outside air temperature, and weight of the aircraft.

24. The method as recited in claim 22 wherein analyzing the sets of actual values employs a least sum of the squares of deviations to identify the given set of actual values which most closely matches the anticipated values.

25. The method as recited in claim 22 wherein deriving an estimate of the vertical airspeed (VS) employs the following equation:

$$VS = VS_{DB} + VS_{RESIDUAL}$$

where $VS_{DB}$ is the value of vertical airspeed from the entry in the database that is selected, and $VS_{RESIDUAL}$ is an adjustment that accounts for deviation of $VS_{DB}$ due to difference between the anticipated values and the actual values of a plurality of operating parameters in the entry in the database that is selected.

26. The method as recited in claim 22 wherein deriving an estimate of the fuel flow rate (FF) employs the following equation:

$$FF = FF_{DB} + FF_{RESIDUAL}$$

where $FF_{DB}$ is the value of vertical airspeed from the entry in the database that is selected, and $FF_{RESIDUAL}$ is an adjustment that accounts for deviation of $VS_{DB}$ due to difference between the anticipated values and the actual values of a plurality of operating parameters in the entry in the database that is selected.

27. The method as recited in claim 22 further comprising:

creating a first database for storing sets of actual values determined from when the aircraft is in a climb phase of flight, and creating a second database for storing sets of actual values determined from when the aircraft is in non-climb phases of flight; and wherein storing in a database stores each set of actual values and the data set aggregate value calculated therefrom in one of the first and second database in response to a phase of flight related to those actual values.

28. The method as recited in claim 27:

further comprising designating whether the point along a flight plan of the aircraft occurs during a climb or a non-climb phase of flight; and wherein selecting an entry, selecting a section, analyzing the sets of actual values, deriving an estimate of the vertical airspeed, and deriving an estimate of the fuel flow rate utilize one of the first and second databases chosen in response to the designating.

29. The method as recited in claim 1 wherein selecting one set of data is based solely on a comparison of the data set aggregate value and the anticipated aggregate value.

30. The method as recited in claim 15 wherein selecting an entry in the database is solely based on which entry has a data set aggregate value that best matches the anticipated aggregate value.

31. The method as recited in claim 22 wherein selecting an entry in the database is solely based on which entry has a data set aggregate value that best matches the anticipated aggregate value.

* * * * *